United States Patent [19]

Drummond

[11] Patent Number: 5,043,106
[45] Date of Patent: Aug. 27, 1991

[54] METHOD OF CASTING OPTICAL MIRRORS

[75] Inventor: David L. Drummond, Albuquerque, N. Mex.

[73] Assignee: Drummond Scientific Company, Broomall, Pa.

[21] Appl. No.: 311,521

[22] Filed: Feb. 15, 1989

[51] Int. Cl.⁵ .............................................. B29D 11/00
[52] U.S. Cl. ..................................... 264/1.9; 264/1.7; 264/2.3; 264/255
[58] Field of Search ................... 264/1.7, 1.9, 2.3, 2.4, 264/2.6, 255

[56] References Cited

U.S. PATENT DOCUMENTS

| | | | |
|---|---|---|---|
| 2,444,532 | 7/1948 | Richardson | 264/1.9 |
| 2,444,533 | 7/1948 | Richardson | 264/1.9 |
| 3,030,259 | 4/1962 | Long | 156/245 |
| 3,306,767 | 2/1967 | Snyder | 264/1.9 |
| 3,378,469 | 4/1968 | Jochim | 204/7 |
| 4,035,065 | 7/1977 | Fletcher et al. | 350/310 |
| 4,188,358 | 2/1980 | Withoos et al. | 264/255 |
| 4,255,364 | 3/1981 | Talbert | 264/1.9 |
| 4,358,507 | 11/1982 | Senaha et al. | 428/429 |
| 4,750,827 | 6/1988 | Assus et al. | 264/1.9 |

Primary Examiner—James Lowe
Attorney, Agent, or Firm—John F. A. Earley; John F. A. Earley, III.

[57] ABSTRACT

A process for making optical mirrors which includes making a rough plaster casting to about the desired shape of the mirror, with the casting having a rough surface, and then applying successive thin layers of polyester resin to the surface of the rough casting to form a finished casting having a smooth coated surface suitable for use as an optical mirror.

13 Claims, 5 Drawing Sheets

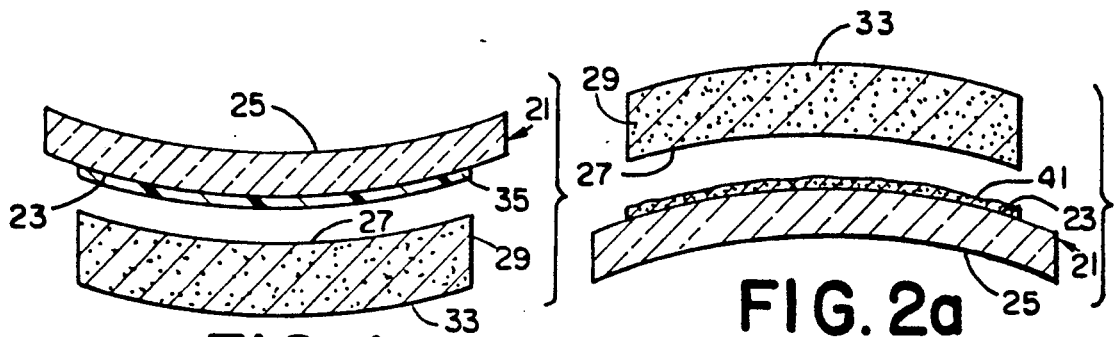
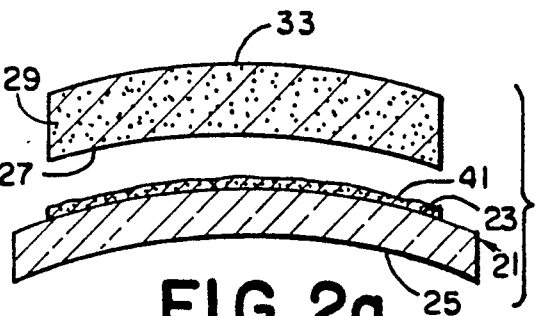

METHOD OF CASTING OPTICAL MIRRORS

BACKGROUND OF THE INVENTION

1. Field of the Invention

This invention relates to a method of making optical mirrors, and more particularly concerns a casting method for making precision optical mirrors for telescopes, film projection systems, and other precision optic apparatus.

2. Description of the Prior Art

Precision optical mirrors have many uses, and, for example, are used in telescopes, projection apparatus, laser apparatus, spectroscopy, and holography, and are used in many types of optical experiments.

Normally, precision optical mirrors are made of glass and are hand polished, which makes them very expensive.

In a typical process for making an optical mirror, a slug of glass is first ground to a rough shape by a machine, and is then polished by hand until the glass meets precision optical requirements of accuracy, to within one-quarter of a wavelength of green light, or 5 millionths of an inch.

Also, precision optical mirrors are usually made only in nearly spherical or flat shapes, because it is very difficult to polish glass to irregular or non-symmetrical shapes such as off-axis parabolic mirrors. In many cases, irregularly shaped mirrors are impractical because they are prohibitively expensive to make.

SUMMARY OF THE INVENTION

It is an object of this invention to provide a method of making precision optical mirrors by using a casting method, which is inexpensive, and also can make irregularly shaped precision optical mirrors.

It is a further object of this invention to provide a method of making precision optical mirrors that is not labor intensive.

In accordance with these and other objects of the invention, the invention comprises a casting method which provides precision optical mirrors, including irregularly-shaped ones, inexpensively by making a rough casting of the desired optical mirror from plaster, and then coating a casting surface with successive layers of thin plastic to provide a plastic surface with the desired optical smoothness.

BRIEF DESCRIPTION OF THE DRAWINGS

FIGS. 1a–1k illustrate the steps of a method of making precision optical mirrors in accordance with the invention;

FIGS. 2a–2b illustrate another embodiment of the invention;

FIGS. 3a–3d are close-up views of the surface of a plaster casting showing how a defect in the casting is treated with successive layers of plastic;

DETAILED DESCRIPTION

Embodiment of FIGS. 1a to 1k

Figure 1A:
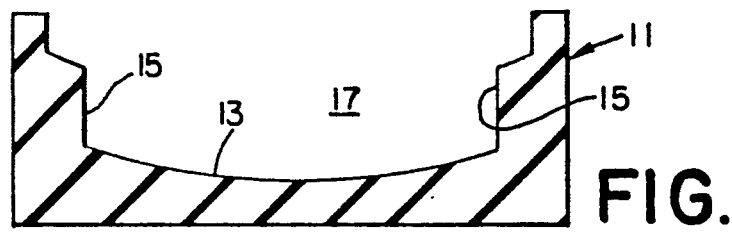
Figure 1B:
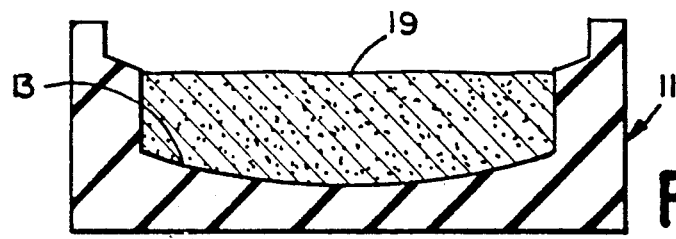
Figure 1C:
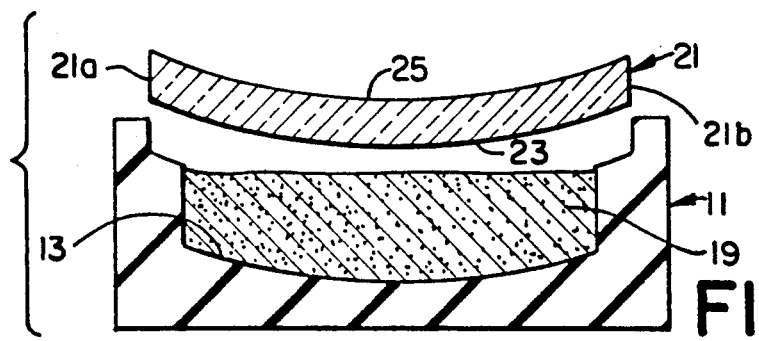
Figure 1D:
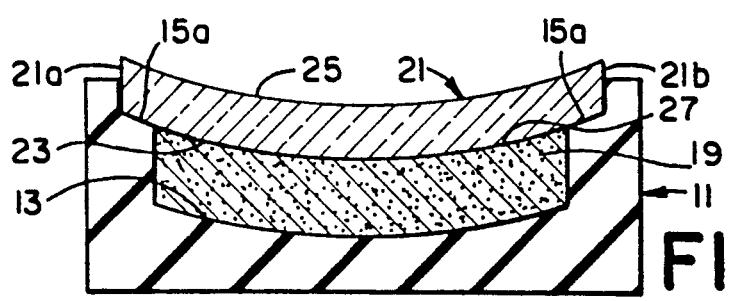
Figure 1E:
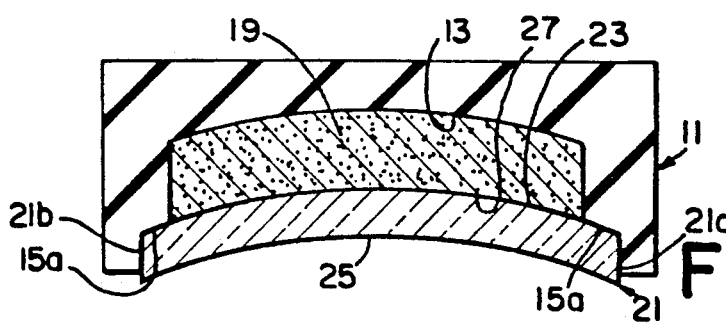
Figure 1F:
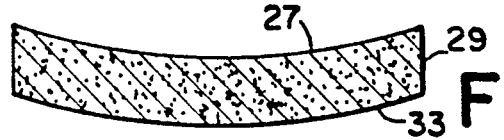

Turning now to the drawings, there is shown in FIGS. 1a–1k a casting method for making precision optical mirrors. The first step in the method is to make a plaster casting having the overall dimensions of the desired finished optical piece.

A rubber mold 11 (FIG. 1a) is made which has a bottom wall 13 with upright circular side walls 15 extending from the edges of bottom wall 13 to form a mold chamber 17.

A liquid plaster of paris 19 is poured into rubber mold chamber 17 (FIG. 1b) to substantially fill the mold chamber 17. The plaster 19 may be any ceramic casting material, including cements, plaster of paris, or Hydrostone high density super gypsum cement manufactured by American Gypsum Company. High density gypsum cement is a preferred casting material.

A glass mold 21 (FIG. 1c) having a convex bottom surface 23 and a concave upper surface 25 is pushed downwardly into the chamber 17 of rubber mold 11 with convex surface 23 facing downwardly and concave surface 25 facing upwardly. Convex surface 23 has been polished to precision optical requirements, and is shaped such that when glass mold 21 is pushed down into chamber 17, a working surface 27 (FIG. 1d) is formed on the plaster 19 in the rubber mold 11, and surface 27 has the desired concave shape of the reflecting surface of the mirror to be made.

The arcuate shape of convex surface 23 of glass mold 21 matches the concave shape of bottom wall 13 of chamber 17 of rubber mold 11.

The plaster 19 is sealed between molds 11, 21 by placing the bottom surface 23 of glass mold 21 in contact with shoulders 15a of upright walls 15 of rubber mold 11. Molds 11, 21 are turned upside down (FIG. 1e) so that any bubbles in plaster 19 rise toward bottom wall 13 of rubber mold 11 and move away from working surface 27 of plaster 19.

Plaster 19 is allowed to harden, which takes about half an hour, and is then separated from rubber mold 11 and glass mold 21 to produce a plaster casting 29 (FIG. f) having a convex surface 33 and a concave working surface 27.

The plaster casting 29 is cured and dried for several weeks in dry air at room temperature, or for several days at 125 to 150 degrees Fahrenheit.

The best results are obtained if the thickness between surfaces 27 and 33 of casting 29 is uniform to within a percent or two.

After the casting 29 is thoroughly dry, it and the glass mold 21 are placed separately into a heating cabinet and are brought to a constant temperature of about 95 degrees Fahrenheit throughout their mass. The concave surface 27 of plaster casting 29 faces upwardly during this heating step.

Then, the convex surface 23 of glass mold 21 is coated with a mold release such as RAIN-X glass mold release, which is sold by Unelco Corp. of Scottsdale, Ariz. 85260.

Then the convex surface 23 of glass mold 21 is covered (FIG. 1g) with a polyester resin layer 35. The polyester resin layer 35 on glass mold 21 is then transferred to concave surface 27 of plaster casting 29 to correct any surface deformities or irregularities on concave surface 27.

To do this, glass mold 21 (FIG. 1g) with its coating 35 is pushed downwardly onto the matching concave surface 27 of plaster casting 29 (FIG. 1h), by applying about one pound per square inch of pressure to glass mold 21 to squeeze out most of polyester resin coating 35 from between glass mold 21 and plaster casting 29. Caution is be taken not to apply too much pressure to mold 21, because it might distort the glass mold 21 and the plaster casting 29.

Glass mold 21 and plaster casting 29 are maintained at a constant temperature while the polyester resin coating 35 is being transferred from glass mold 21 to plaster casting 29 to prevent thermal distortion of mold 21 or casting 29.

Polyester resin coating 35 is allowed to harden on plaster casting 29 by holding plaster casting 29, polyester resin coating 35 and glass mold 21 together at a constant temperature of about 95 degrees Fahrenheit for about two hours.

The coated casting 29 is separated from glass mold 21 by placing them into a freezer and freezing them which shrinks apart the coated casting 29 from glass mold 21. The coated casting 29 and glass mold 21 separate from each other because outer surfaces 33 and 25, convex surface 33 (FIG. 1h) of plaster casting 29 and concave surface 25 of glass mold 21, cool faster than the inboard surfaces 27 and 23. This causes a temperature strain that makes convex surface 33 of plaster casting 29 and concave surface 25 of glass mold 21 curl back slightly and separate plaster casting 29 from mold 21.

The polyester resin coated plaster casting 29 is cured in a drying cabinet at a constant temperature of about 95 degrees Fahrenheit for about two weeks to allow all stress in coating 35 to stabilize.

At this point in the process, the surface of polyester resin coating 35 is accurate to within about five or ten wavelengths of green light, but may still have a number of small dimples or pits, as well as other surface irregularities, because of the imperfect texture of plaster casting 29. The surface of casting 29, even with its plastic coating 35, does not yet meet the precision required for optical mirrors, so an additional polyester resin coating must be added to casting 29.

After curing, the polyester layer 35 of plaster casting 29 is cleaned by rubbing coating 35 with No. 600 abrasive powder, and then washing it with trichlorotrifluoro ethane that removes dirt and also roughens polyester layer 35 so that a next layer easily adheres to it. Caution is exercised, however, because the abrasive may damage the surface of coating 35.

A second polyester resin layer 37 is applied to plaster casting 29 by pouring more polyester resin onto convex surface 23 of glass mold 21 and, as before, pushing glass mold 21 (FIG. 1i) with its convex coating 37 facing downwardly onto matching coated concave surface 27 of plaster casting 29, exerting about one pound per square inch of pressure on glass mold 21 to squeeze out most of the polyester resin from between coated glass mold 21 and plaster casting 29.

Glass mold 21 and plaster casting 29 are maintained at a constant temperature while applying the second polyester resin coating 37 to coating 35 on plaster casting 29 to prevent thermal distortion of mold 21 or casting 29.

The second polyester resin coating 37 is allowed to harden on plaster casting 29, and then casting 29 is separated from glass mold 21 by freezing casting 29 and glass mold 21, as described above.

The second polyester resin coating 37 is cured on casting 29 in a drying cabinet at about 95° Fahrenheit for about two weeks.

After the second polyester resin coating 37 has been applied to plaster casting 29, the concave surface of layer 37 of plaster casting 29 is accurate to within about one wavelength of green light of the desired shape of the optical mirror. At this point, approximately 99 percent of the surface deformities of casting 29 have been corrected, but the surface of layer 37 still does not meet the precision required for optical instruments so a third layer of polyester resin coating is applied to casting 29.

The concave surface of layer 37 of casting 29 is cleaned by rubbing it with No. 600 abrasive powder and then washing it with trichlorotrifluoro ethane.

A third polyester resin coating or layer 39 is applied (FIG. 1j) on top of second polyester resin layer 37 by pouring polyester casting resin onto the convex surface 23 of glass mold 21, and then pushing treated glass mold 21 downwardly with its convex surface 23 facing downwardly onto matching concave surface of layer 37 of plaster casting 29, applying about one pound per square inch of pressure to glass mold 21 to squeeze out most of the polyester resin from between glass mold 21 and plaster casting 29. While transferring layer 39 to plaster casting 29, glass mold 21 and plaster casting 29 are maintained at a constant temperature of 95° Fahrenheit to prevent thermal distortion of mold 21 or casting 29.

Polyester resin coating 39 is hardened at a constant temperature of about 95° Fahrenheit for about two hours until it becomes hard. Casting 29 is then separated from glass mold 21 by freezing as described above.

After application of third polyester resin coating 39, (FIG. 1k) plaster casting 29 is within about a quarter of a wavelength of green light of the desired shape of an optical mirror, and is now suitable for optical use. Approximately 99.9 percent of the defects in the original working surface 27 of casting 29 have been filled in or covered over. If any defects remain, additional layers may be added using the method described above.

The outer polyester resin layer 39 is coated with a layer 40 (FIG. 1k) of aluminum which reflects light so plaster casting 29 becomes a precison optical mirror.

The process as described above is satisfactory for curved optical mirrors of up to about three inches in diameter. For larger optical mirrors, the process described above does not work properly because the internal heat generated by the curing plaster 19 warps the casting.

A solution to this problem of making larger diameter optical mirrors is to coat the initial plaster casting 29 with a thin layer of plaster before applying the polyester resin coatings 35, 37 or 39 to plaster casting 29.

FIGS. 2a to 2b illustrate a casting method for large pieces in which a plaster casting 29 is made by providing liquid plaster 19 into mold chamber 17, pressing glass mold 21 onto the top surface of the plaster to form plaster casting 29, separating plaster casting 29 from glass mold 21, allowing plaster casting 29 to cure, applying a thin layer 41 of plaster to convex surface 23 of glass mold 21, pushing concave surface of casting 29 downwardly on convex surface of glass mold 21 with its wet plaster layer 41, and allowing the layer 41 to harden onto surface 27 of plaster casting 29.

Plaster casting 29 with layer 41 is separated from glass mold 21 and is cured in dry air at room temperature until thoroughly dry.

Layer 41 is so thin it does not generate significant heat during curing, and provides a more accurate surface than surface 27.

The three polyester resin layers 35, 37, 39 are applied to plaster casting 29 so that the top surface of layer 39 (FIG. 2b) is accurate to within about a quarter of a wavelength of green light of the desired shape, and is suitable for optical use.

The effect of the successive layers of polyester resin may best be seen in FIGS. 3a-3d. FIG. 3a shows an imperfection or dimple 43 in surface 27 of casting 29, which would prevent the use of casting 29 for precision optics.

FIG. 3b shows dimple 43 after first layer 35 of polyester resin has been applied to casting 29. Resin layer 35 hardens, it shrinks, and only 90% of dimple 43 remains filled in.

FIG. 3c shows dimple 43 after the second layer 37 of polyester resin is applied over first layer 35. Approximately 99% of dimple 43 is filled in, which is a factor of ten improvement in accuracy over first layer 35.

FIG. 3d shows that after the third layer 39 of polyester resin has been applied over second layer 37, 99.9% of dimple 43 is filled in and plaster casting 29 may be used for precision optics.

Embodiment of FIGS. 4a to 4h

In another embodiment of a casting method for making concave precision optical mirrors, there is provided a rubber mold 51 (FIG. 4a) having interior dimensions that are determined by the shape of the desired optical mirror. Rubber mold 51 includes a chamber 52 with a convex bottom surface 53 and vertical side walls 55. A removable rubber lid 59 having a concave bottom surface 60, fits on top of rubber mold 51.

The convex shape of mold surface 53 matches the concave shape of lid bottom surface 60 when lid 59 is placed on mold 51 so that when plaster 61 is poured into chamber 52, it hardens into a shape with top and bottom surfaces being parallel.

Liquid plaster 61 (FIG. 4b) is poured into mold chamber 52, and lid 59 (FIG. 4c) is placed on rubber mold 51 to seal the plaster 61 in mold chamber 57 and form a rough plaster casting 63.

Plaster casting 63 is allowed to harden in rubber mold 51, and is removed, when hard, from mold 51 and cooled by immersing it in a container of water at room temperature. Casting 63 (FIG. 4d) has a convex surface 67 and a concave surface 65 which is the same shape as the desired optical mirror, and is of uniform thickness between surfaces 65 and 67.

A glass mold 69 (FIG. 4d) is provided which has a convex top surface 71 that is polished to within a quarter of a wavelength of green light, and a flat bottom surface 73. Glass mold 69 is used to apply layers of plastic to plaster casting 63 because glass mold 69 has a polished surface that produces plaster layers with accurate surfaces.

Another layer 75 of plaster is applied to concave surface 65 of casting 63 before applying any resin layers. The additional plaster layer 75 is applied to casting 63 (FIG. 4d) by covering convex top surface 71 of glass mold 69 with layer 75 of wet plaster about one-sixteenth of an inch thick, and setting the concave surface 65 of plaster casting 63 on wet plaster layer 75 on glass mold 69, and allowing layer 75 to harden onto convex surface 65 of plaster casting 63.

After plaster layer 75 has hardened onto concave surface 65 of plaster casting 63, the plaster coated plaster casting 63 is removed from glass mold 69. Concave surface 65 now has a surface accuracy of better than one-tenth of a thousandth of an inch. This accuracy is obtained for plaster castings with diameters up to ten inches.

The plaster coated plaster casting 63 is cured and dried for several weeks in dry air or for several days at 125 to 150 degrees Fahrenheit.

The next step is to apply layers of polyester resin to the cured plaster casting 63. Convex top surface 71 of glass mold 69 is treated, or coated, with RAIN-X glass mold release. Glass mold 69 and plaster casting 63 are placed separately in an oven and are maintained at a constant temperature of about 95 degrees Fahrenheit, which is the approximate equivalent of a curing temperature for a polyester resin, to bring the mold 69 and casting 63 to a constant temperature throughout their mass.

Casting 63 is now ready for the application of the successive layers of polyester resin.

Polyester resin is poured onto glass mold 69 to form a polyester resin layer 77, and dry plaster casting 63 (FIG. 4e) is pressed onto polyester resin layer 77. The polyester resin layer 77 is about 0.002 inches thick. The resin layer 77 is allowed to cure and attach itself to concave surface of layer 75 of plaster casting 63. The period for curing is about three hours, during which glass mold 69 and plaster casting 63 are maintained at a uniform temperature.

When polyester resin layer 77 is cured, the resin coated plaster casting 63 is detached from glass mold 69 (FIG. 4f), and casting 63 is aged to allow all stresses in the polyester resin coating 77 to stabilize. The aging takes place at about 100 degrees Fahrenheit for about a week.

At this stage, the polyester resin layer 77 of plaster casting 63 is within about five or ten wavelengths of green light accuracy, but has a number of small dimples or pits, along with other surface irregularities reflecting the texture of plaster casting 63. Accordingly, a second layer 79 of polyester resin must be added on top of plaster casting 63.

The surface of resin layer 77 is cleaned by rubbing surface 77 with No. 600 abrasive powder and then washing it with trichlorotrifluoro ethane before the second layer 79 of resin is applied to it so that the second layer 79 easily adheres to the first layer 77.

Second polyester resin layer 79 (FIG. 4f) is poured onto glass mold 69 and the polyester resin coated plaster casting 63 is pressed onto polyester resin layer 79 until layer 79 is about 0.002 inches thick.

The polyester resin layer 79 is allowed to cure, and attach itself to the surface of polyester layer 77, at curing temperature of about 85 degrees Fahrenheit for about three hours. Glass mold 69 and plaster casting 63 remain attached and are maintained at uniform temperatures throughout the cure. After curing, the coated plaster casting 63 is detached from glass mold 69, and the second polyester resin layer 79 is aged at a minimum temperature of 100 degrees Fahrenheit for at least a week to allow all stresses in the polyester resin layer 79 to stabilize.

After the second polyester resin layer 79 has been applied to casting 63, it is accurate only to within about one wavelength of green light of the desired shape. Plaster casting 63 is then coated with a third polyester resin layer to make the casting 63 suitable for optical use.

Layer 79 is cleaned by rubbing layer 79 with No. 600 abrasive powder, and then washing it with trichlorotrifluoro ethane.

Glass mold 69 (FIG. 4g) is coated with a polyester resin layer 81, and plaster casting 63 is pressed on coating 81 until the polyester resin layer is about 0.002 inches thick.

Polyester resin layer 81 is allowed to cure and attach itself to the surface of polyester resin layer 79 at curing temperature of about 85 degrees Fahrenheit for about three hours. Glass mold 69 and plaster casting 63 are maintained at a uniform temperature throughout the cure. Plaster casting 63 is detached from glass mold 69.

The accuracy of the coating of plaster casting 63 is within a quarter of a wavelength of green light after the third polyester resin layer 81 has been applied, and is suitable for optical use.

The third polyester resin layer 81 (FIG. 4h) is coated with a layer of aluminum 83 which reflects light and allows plaster casting 63 to be used as a precision optical concave mirror.

The layers of polyester resin are approximately 0.002 inches thick. It is desirable to make the layers of resin as thin as possible, because thinner layers of resin produce the best mirrors. Polyester resin has been disclosed only as an example of the type of plastic that may be used with this invention, and any type of plastic may be used, with preference being given to thermosetting plastics.

The embodiments of the invention described above have been limited to mirrors which have concave working surfaces, but the invention is not to be construed to be limited to any particular shape of precision optical mirrors. Many shapes of mirrors, including convex, concave and non-symmetrical, may be made using the method of the invention.

Normally all precision optical mirrors are polished from glass, and it is very difficult and expensive to make precision optical mirrors which are not spherical or flat. Using the casting method described above, a non-symmetrical mirror such as an off-center parabolic mirror may be easily and inexpensively made.

For example, an off-center parabolic mirror may be made using a six inch diameter glass mold and a three inch diameter rubber mold. Plaster is poured into the rubber mold, and the rubber mold then is placed plaster-side down onto the glass mold at an off-center position. The plaster hardens into a casting having an off-center parabolic surface which is then coated with successive layers of polyester resin so that the final surface of the casting conforms to precision optical standards and is coated with aluminum to form an off-center parabolic precision optical mirror.

Embodiment of FIGS. 5a-5j

Figure 4A:
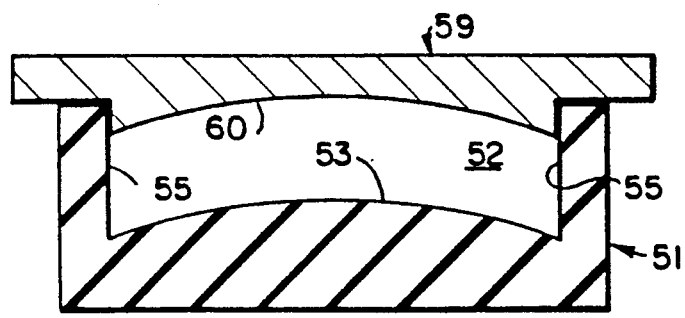
FIGS. 4a–4h show the steps of another embodiment of the invention.
Figure 4B:
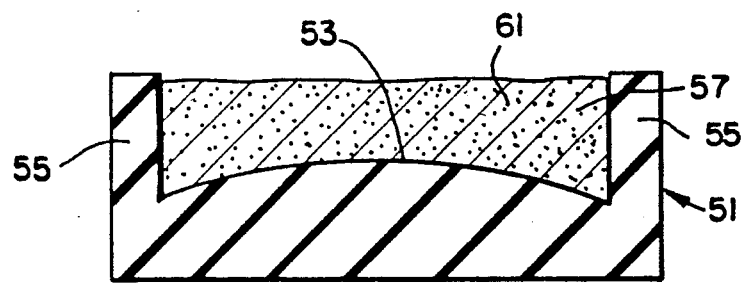
Figure 4C:
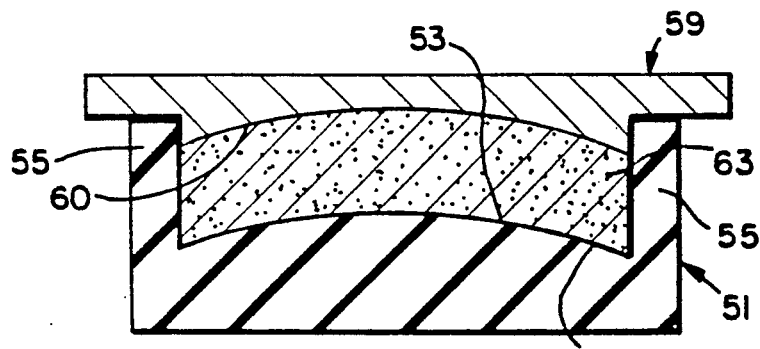
Figure 4D:
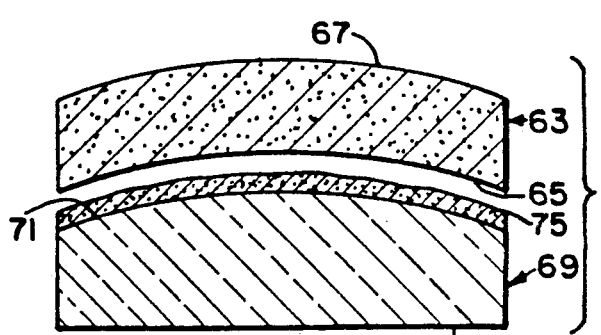
Figure 4E:
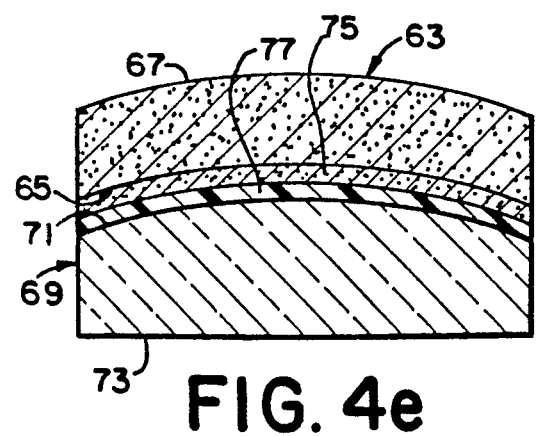
Figure 4F:
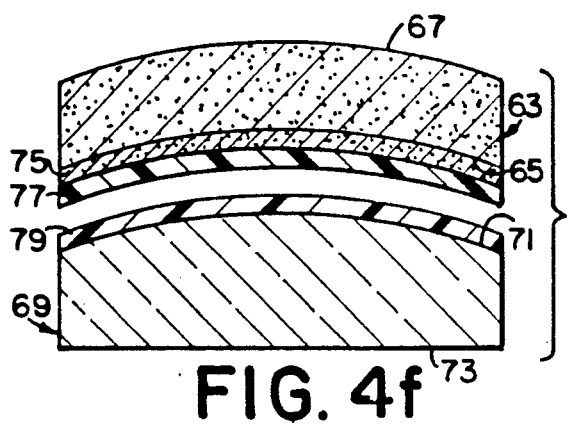
Figure 4G:
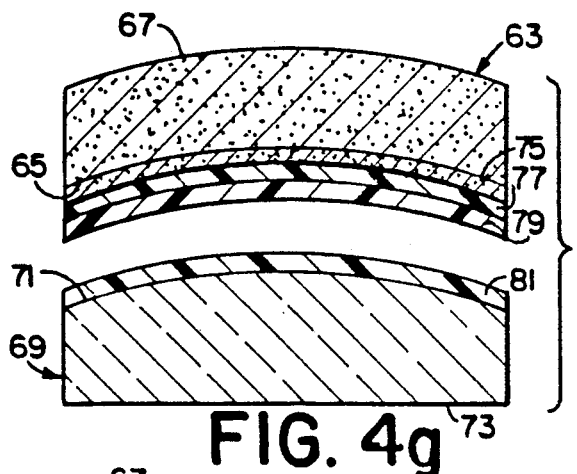
Figure 4H:
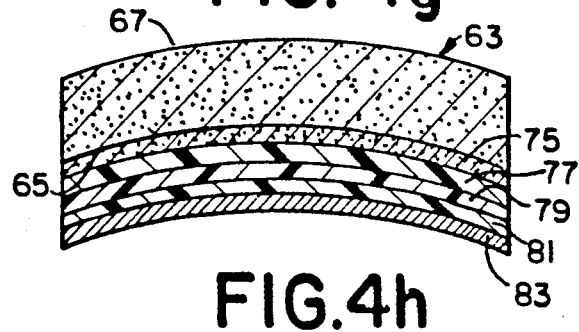
Figure 5A:
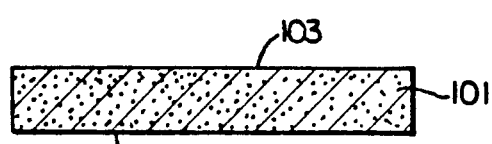
FIGS. 5a–5j show the steps of an embodiment of the invention for making precision flat optical mirrors.
Figure 5B:
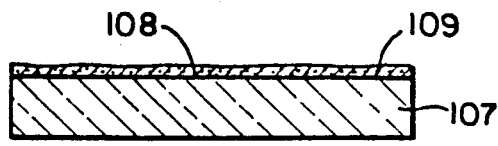
Figure 5C:
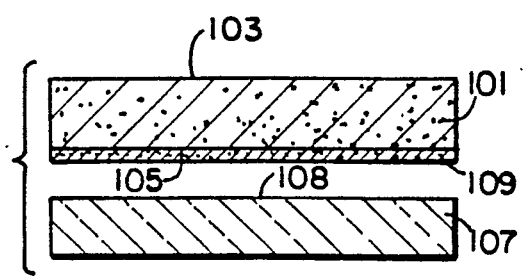
Figure 5D:
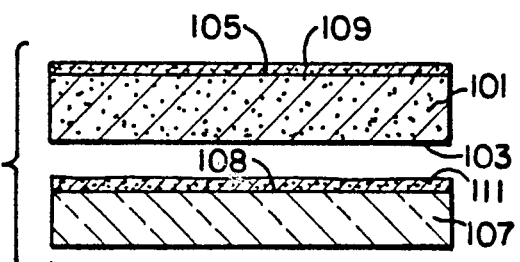
Figure 5E:
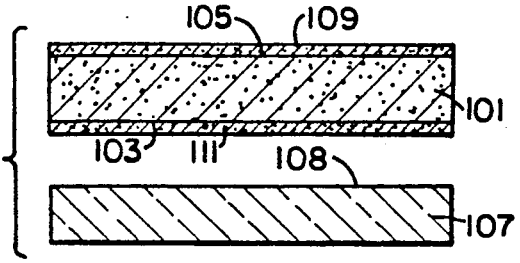
Figure 5F:
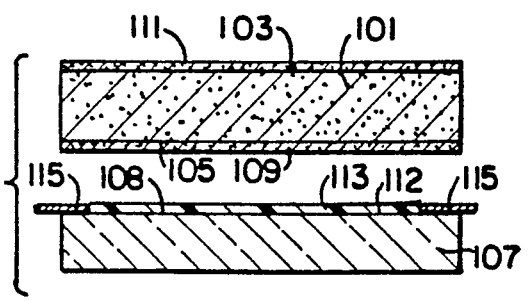
Figure 5G:
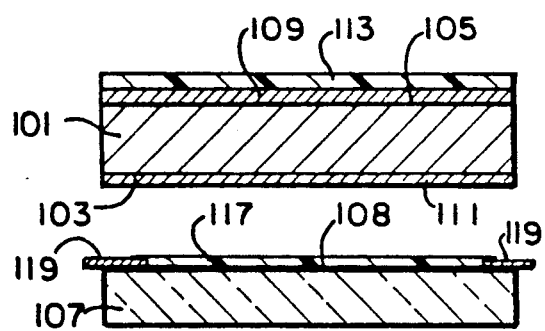
Figure 5I:
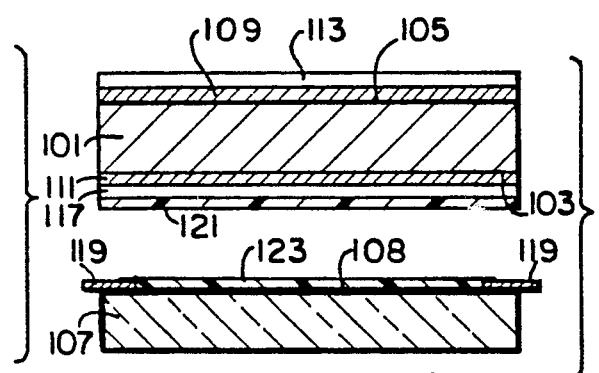
Figure 5H:
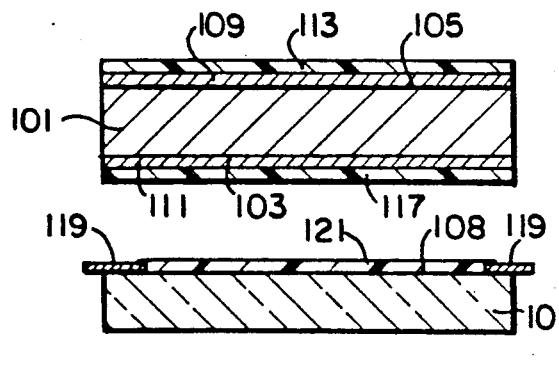
Figure 5J:
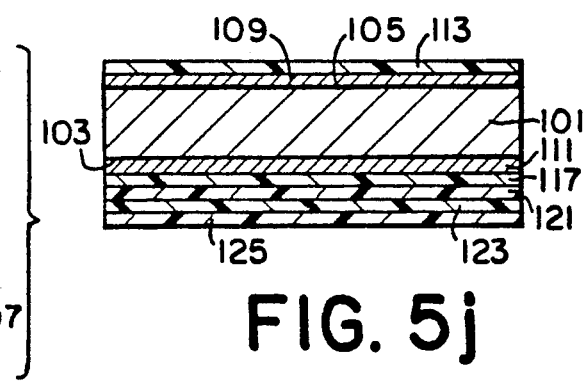

A mirror produced by the inventive method curls slightly as its temperature changes because the coefficients of thermal expansion of the polyester layers differ from the coefficient of thermal expansion of the plaster substrate. For a curved mirror, such as is shown in FIGS. 1k and 4h, the curl is not normally detectable, since the curl only slightly changes the focal length of the mirror without changing its basic shape. For example, if a spherical surface is curled, the surface remains spherical, and only the radius changes.

A flat surface is a special case, however, because any curl of a flat mirror drastically affects the quality of the mirror and is unacceptable Accordingly, a different embodiment for preparing precision optically flat mirrors is necessary, and is described as follows.

Turning again to the drawings (FIG. 5a-5j), a flat plaster disk 101 having a flat top surface 103 and a flat bottom surface 105 is cast with plaster to the diameter and approximate thickness between surfaces 103 and 105 of a desired mirror.

Plaster casting 101 is immersed in water at room temperature for approximately one-half hour to saturate casting 101 with water and bring it to a constant temperature throughout its mass. Casting 101 is then removed from the water and the excess water is wiped from it.

A glass mold 107 (FIG. 5b) is provided having a flat top surface 108 which is flat to one-tenth of a wavelength of green light, and which has a diameter at least as large as the diameter of plaster casting 101.

The flat surface 108 of glass mold 107 is coated (FIG. 5b) with a thin layer 109 of plaster, and the bottom surface 105 of plaster casting 101 is pressed onto the wet plaster coating 109.

The layer 109 of plaster is cured for about an hour, and then flat glass mold 107 is pulled away from rough casting 101 so that the thin layer 109 of plaster (FIG. 5c) adheres to surface 105 of plaster casting 101.

Coated plaster casting 101 is immersed in water to saturate it with water and bring it to a constant temperature throughout its mass, and is removed from the water and the excess water is wiped from it.

Flat surface 108 of glass mold 107 (FIG. 5d) is coated with a thin layer of plaster 111, and the other surface 103 of plaster casting 101, is pressed onto the wet plaster coating 111. Layer 111 of plaster is cured for about an hour, and flat glass mold 107 is pulled away (FIG. 5e) from plaster casting 101 so that the thin layer of plaster 111 adheres to surface 103 of casting 101.

Now, both sides 103, 105 (FIG. 5e) of casting 101 have a surface coating layer 109, 111 of plaster accurate to within one-tenth of a thousandth of an inch.

Plaster casting 101 is then cured for several weeks in dry air at room temperature or for several days at 125 to 150 degrees Fahrenheit.

Next, glass mold 107 is coated with a Rain-X glass release layer 112, and plaster casting 101 and glass mold 107 are each placed in an oven at about 80 degrees Fahrenheit until they reach a constant temperature throughout their mass.

A polyester resin layer 113 (FIG. 5f) is poured over release layer 112 and top surface 108 of glass mold 107, and flat surface 105 of casting 101 is pressed onto layer 113 of glass mold 107 to form a polyester resin coating 113 about six thousandths of an inch thick. The thickness of polyester resin coating 113 is controlled by inserting six thousandths of an inch thick shims 115 (FIG. 5f) at the edge of casting 101 between casting 101 and glass mold 107. Polyester resin layer 113 is cured at a constant temperature of about 80 degrees Fahrenheit for three hours.

Plaster casting 101 and glass mold 107 are separated by placing them in a freezer where the cold temperature causes the pieces to separate because of the differences in thermal expansion between the glass 107 and plaster casting 101.

After they have been separated, plaster casting 101 and glass mold 107 are placed in an oven until they reach a constant temperature of about 80 degrees Fahrenheit throughout their mass. At that time, a thin layer 117 of polyester resin (FIG. 5g) is poured over surface 108 of glass mold 107, and top surface 103 of casting 101 is pressed onto polyester resin layer 117 until the thickness of layer 117 is two thousandths of an inch thick.

The thickness of polyester resin coating 117 is controlled by inserting two-thousandths of an inch thick shims 119 at the edge of casting 101 between plaster casting 101 and glass mold 107. Polyester resin layer 117 is cured at a constant temperature of about 80 degrees Fahrenheit for about three hours, and then casting 101 is separated from glass mold 107 by placing the pieces in a freezer. Then the coated plaster casting 101 is placed in a heated cabinet at 100° Fahrenheit for one week to relieve stresses in the polyester layers.

A second layer 121 (FIG. 5h) of polyester resin, which also has a thickness of two thousandths of an inch, is placed on top of the first layer 117 of polyester resin coating on surface 103 of casting 101 in the same manner layer 117 was applied to layer 111 of casting 101 as described above. Resin layer 121 (FIG. 5h) is poured on surface 108 of glass mold 107, and then coating 117 of plaster casting 101 is pressed against layer 121 of glass mold 107. Resin layer 121 is allowed to cure and the pieces are separated, so that there are two layers 117, 121 on surface 103 of plaster casting mold 101. The second resin layer 121 is necessary because the surface of first layer 117 does not conform to precision optical requirements. Then casting 101 is placed in a heated cabinet for one week at 100° Fahrenheit to relieve stresses in the polyester layers.

A third layer 123 (FIG. 5i) of two-thousandths of an inch thick polyester resin is placed on top of the second layer 121 of polyester resin in the same way that first layer 117 and second layer 121 were applied to plaster casting 101. Resin layer 123 is within one-quarter of a wavelength of green light.

The finished plaster casting 101 has a single six thousandths of an inch layer 113 of polyester resin on bottom surface 105 and three successive layers 117, 121, 123, each of two thousandths of an inch thick polyester resin on surface 103. Layer 123 is flat to within about a quarter of a wavelength of green light over a temperature range of 30 degrees Fahrenheit around the casting temperature, and (FIG. 5j) layer 123 is covered with a reflective coating 125 of aluminum to form a mirror.

The compensating layers of plastic on the surface 103 and surface 105 of casting 101 flatten the mirror over a wide temperature range. The total thickness of the polyester resin layers is six thousandths of an inch on both surface 103 and surface 105 of casting 101 to prevent thermal curling in casting 101. If only one flat surface 103, 105 of casting 101 is coated with plastic, the coated surface of casting 101 curls and does not conform to precision optic requirements.

I claim:

1. A method of making an optical mirror comprising
making a solid hard casting with a working surface that has the approximate shape and size of the desired mirror but has a rough surface;
applying a first thin smoothing layer of plastic on the working surface to make the top surface of the first thin layer smoother and more accurate than the working surface.
applying a second thin smoothing layer of plastic on top of the first thin layer of plastic to make the outer surface of the second thin layer smoother and more accurate than the top surface of the first thin layer,
and applying a third thin smoothing layer of plastic on top of the second thin layer of plastic so that the third thin layer of plastic on the working surface is smoother and more accurate than the top surface of the second thin layer and is accurate to within one-quarter of a wavelength of green light, and
coating the third thin plastic layer with a reflective material to form a finished casting which may be used as a precision optical mirror.

2. The method of claim 1, further comprising
applying a thin layer of casting material to the working surface of the casting before applying the thin layers of plastic.

3. The method of claim 1, further comprising
making the casting by pouring liquid plaster into a chamber in a rubber mold,
pressing a glass mold onto the plaster in the rubber mold to cast the plaster into a desired mirror shape,
forming on the plaster a working surface that has a desired shape of the reflecting surface of the mirror,
allowing the plaster to harden and form a solid casting,
separating the plaster casting from the molds, and curing the plaster casting.

4. The method of claim 1, further comprising
applying the thin layers of plastic on the working surface of the casting by bringing the casting and a glass mold to a uniform temperature throughout their masses,
pouring a polyester resin layer onto the glass mold,
pressing the polyester resin layer and the glass mold against the working surface of the casting so the polyester resin layer adheres to the casting,
hardening the polyester resin layer on the casting,
separating the glass mold from the casting, and curing the polyester resin coated casting.

5. A method of making a precision optical mirror, comprising
(a) providing a rubber mold having a bottom wall with upright side walls extending from the edges of the bottom wall to form a mold chamber with the side walls having a shoulder between the top and bottom side walls,
(b) pouring liquid plaster into the rubber mold to substantially fill the mold chamber with plaster,
(c) providing a polished glass mold having a convex surface and a concave surface,
(d) pushing the glass mold into the rubber mold with the convex surface of the glass mold facing downwardly and the concave surface of the glass mold facing upwardly,
(e) sealing the plaster between the molds by pressing the bottom of the glass mold against the shoulder of the upright walls of the rubber mold,
(f) turning the molds upside down so that any bubbles in the plaster rise toward the bottom wall of the rubber mold and move away from the convex surface of the glass mold,
(g) allowing the plaster to harden for about half an hour to produce a plaster casting having a concave surface and a convex surface,
(h) separating the plaster casting from the glass mold and the rubber mold,
(i) allowing the plaster casting to cure for about one week or until thoroughly dry,
(j) separately placing the plaster casting and the glass mold in a heater cabinet with the concave surface of the plaster casting facing upwardly,
(k) heating both the plaster casting and the glass mold at the same temperature of about 95° Fahrenheit,
(l) coating the convex surface of the glass mold with a mold release, (m) pouring a polyester resin onto the convex surface of the glass mold to coat the convex surface of the glass mold with a resin layer, (n) pushing the coated glass mold down with its convex surface facing downwardly onto the matching concave surface of the plaster casting and applying about one pound per square inch to the glass mold to squeeze out the excess polyester resin from between the glass mold and the plaster casting, (o) maintaining the glass mold and plaster casting at a constant temperature to prevent thermal distortion of the mold or the casting, (p) holding the plaster casting, polyester resin layer, and glass mold at a constant temperature of about 95° Fahrenheit for about two hours until the polyester resin layer on the casting becomes hard, (q) separating the polyester resin coated plaster casting from the glass mold, (r) said separating being accomplished by placing the polyester resin coated casting and glass mold into a freezer to shrink apart the coated plaster casting and the glass mold because of the differences in thermal expansion, (s) curing the polyester resin coated plaster casting by placing it in a heated cabinet at about 95° Fahrenheit for about two weeks, (t) cleaning the polyester layer of the plaster casting, (u) repeating the above process steps (m) through (t) of applying a polyester resin layer to the casting until the surface of the outer polyester resin layer conforms to the accuracy requirements for optical mirrors, a surface tolerance of within about one-quarter of the wavelength of light, (v) and covering the surface of the outer polyester resin layer with a coating of aluminum to make it reflect light for use as a mirror.

6. A method of making a precision optical mirror, comprising (a) providing a rubber mold having a convex bottom surface and vertical side walls which form a mold chamber, and a concave removable top, (b) pouring liquid plaster into the mold chamber and placing the top on the mold to form a rough plaster casting with a concave top surface and a convex bottom surface having the same shape as the desired optical mirror and a uniform thickness between the concave top surface and the convex bottom surface, (c) allowing the rough plaster casting to harden in the rubber mold chamber, (d) removing the hardened plaster casting from the rubber mold, (e) cooling the plaster casting by immersing it in water at room temperature, (f) polishing a convex glass mold to within a quarter of a wavelength of the desired shape, (g) covering the convex surface of the glass mold with a layer of wet plaster about one-sixteenth of an inch thick, (h) setting the concave top surface of the plaster casting on the wet plaster layer in the glass mold, (i) allowing the wet plaster layer to harden onto the concave surface of the plaster casting, (j) removing, when the wet plaster layer has hardened onto the concave top surface of the plaster casting, the plaster coated plaster casting from the glass mold with the outer surface of the plaster casting now having a surface accuracy of better than one tenth of a thousandth of an inch, even for castings with diameters as large as ten inches, (k) the plaster being used for the plaster layer being high density super gypsum cement, (l) curing and drying the plaster coated plaster casting for about one week in dry air or until thoroughly dry, (m) treating the convex surface of the glass mold with a mold release, (n) maintaining the glass mold and the plaster casting at the curing temperature for polyester resin until the glass mold and plaster casting reach a constant temperature throughout their mass, (o) pouring polyester resin onto the glass mold, (p) pressing the concave top surface of a finished dry plaster cast onto the polyester resin on the glass mold until the resin layer is about 0.002 inches thick, (q) allowing the polyester resin to cure and attach itself to the concave surface of the plaster casting for about 3 hours at curing temperature, (r) maintaining the glass mold and the plaster casting at uniform temperatures throughout the cure, (s) detaching the resin coated plaster casting from the glass mold after completing the cure of the resin coating, (t) aging the resin coated plaster casting at a temperature of at least 95° F. for at least a week to allow all stresses in the resin to stabilize, (u) cleaning the surface of the resin layer, (v) repeating steps (m) through (t) to produce a resin coated top surface of the casting which is accurate to within about 1 wavelength of green light, (w) cleaning the surface of the resin layer again, (x) repeating steps (m) through (t) to produce a resin coated surface of the casting which is accurate to within about ¼ wavelength of green light and is suitable for optical use, and (y) covering the surface of the outer polyester resin layer with a coating of aluminum which reflects light for use as a mirror.

7. A method of making a flat optical mirror, comprising casting a hard solid disk of plaster having a flat top surface and a flat bottom surface to the approximate diameter and thickness of the desired mirror, applying a thin layer of plaster to the top surface to obtain a more accurate top surface than the flat top surface of the plaster disk, applying a thin layer of plaster to the bottom surface of the flat disk to obtain a more accurate bottom surface than the bottom surface of the plaster disk, applying a thin first layer of plastic on the thin layer of plaster on the top surface of the flat disk to obtain a smoother and more accurate top surface of plastic than the top surface of plaster, applying a thin first layer of plastic on the thin layer of plaster on the bottom surface of the flat disk to obtain a smoother and more accurate bottom surface of plastic than the bottom surface of plaster, the top and bottom thin first layers of plastic having the same thickness, applying a second thin layer of plastic on the first top thin layer of plastic to obtain a smoother and more accurate top surface than the first top thin layer of plastic, applying a second thin layer of plastic on the first bottom thin layer of plastic to obtain a smoother and more accurate bottom surface than the first bottom thin layer of plastic, the top and bottom thin second layers of plastic having the same thickness, applying a third thin layer of plastic on the second top thin layer of plastic to obtain a smoother and more accurate top surface than the second top thin layer of plastic, applying a third thin layer of plastic on the second bottom thin layer of plastic to obtain a smoother and more accurate bottom surface than the second bottom thin layer of plastic, the top and bottom third think layers of plastic having the same thickness, and covering the top surface of the top third thin plastic layer of the flat disk with a coating of aluminum which reflects light for use as a precision mirror.

8. The method of claim 7, further comprising
(a) applying the thin layers of plaster to the flat disk by providing a glass mold which is flat to one-tenth of a wavelength of light and which has a diameter at least as large as the diameter of the flat disk,
(b) coating the surface of the glass mold with a thin layer of plaster,
(c) pressing the top surface of the flat disk onto the wet plaster on the glass mold,
(d) curing the thin layer of plaster,
(e) pulling the mold away from the rough casting so that the thin layer of plaster adheres to the top surface of the flat disk, and
(f) repeating steps (b) through (e) to apply a thin layer of plaster to the bottom surface of the flat disk.

9. The method of claim 7, further comprising
applying the first thin layer of plastic to the flat disk by
(a) providing a glass mold which is flat to one-tenth of a wavelength of light and which has a diameter at least as large as the diameter of the flat disk,
(b) heating the flat disk and the glass mold to a constant temperature throughout their mass,
(c) pouring a plastic resin layer over the top surface of the glass mold,
(d) pressing the one surface of the flat disk onto the glass mold,
(e) curing the plastic resin layer while maintaining a constant temperature so that the resin layer attaches itself to the surface of the flat disk,
(f) separating the coated casting from the mold,
(g) curing the resin layer on the flat disk, and
(h) repeating steps (b) through (g) to apply a plastic resin layer to the other surface of the flat disk,
repeating steps (b) through (g) to apply second plastic resin layers to the two surfaces of the flat disk,
and repeating steps (b) through (g) to apply the third plastic resin layers to the two surfaces of the flat disk.

10. A method for making a precision optically flat mirror, comprising
(a) casting a flat disk with high density gypsum cement to the diameter and approximate thickness of the desired mirror,
(b) immersing the flat disk in water at room temperature for approximately one-half hour to saturate the flat disk with water and bring the temperature of the flat disk to equilibrium,
(c) providing a glass mold which is flat to one-tenth of a wavelength of light and which has a diameter at least as large as the diameter of the flat disk,
(d) removing the flat disk from the water,
(e) wiping the excess water from the flat disk,
(f) coating the surface of the flat glass mold with a thin layer of wet high density gypsum cement,
(g) pressing the top surface of the flat disk onto the wet cement coating on the flat glass mold,
(h) curing the thin layer of wet high density gypsum cement for approximately an hour,
(i) pulling the flat glass mold away from the flat disk so that the thin layer of high density gypsum cement adheres to the top surface of the flat disk,
(j) repeating the above process step (b),
(k) repeating the above process steps (d) through (g) on the bottom surface of the flat disk so that both surfaces of the flat disk have a coating of high density gypsum cement accurate to within one-tenth of a thousandth of an inch,
(l) curing the flat disk in dry air until the casting is thoroughly dry,
(m) coating the glass mold with a mold release,
(n) placing the flat disk and the glass mold in a temperature controlled environment at 80 degrees Fahrenheit until the flat disk and the glass mold come to the same temperature throughout their mass,
(o) pouring a polyester resin layer over the surface of the glass mold,
(p) pressing the bottom surface of the flat disk onto the glass mold until the thickness of the polyester resin layer is approximately six thousandths of an inch thick,
(q) controlling the thickness of the polyester resin layer on the flat disk by placing six thousandths of an inch thick shims at the edge of the flat disk between the flat disk and the glass mold,
(r) curing the polyester resin layer for three hours, while maintaining a constant temperature of approximately 80 degrees Fahrenheit,
(s) separating the flat disk from the glass mold by placing the flat disk and the glass mold in a freezer,
(t) placing the flat disk and the glass mold into a temperature controlled environment at 80 degrees Fahrenheit until the flat disk and the glass mold reach a constant temperature throughout their mass,
(u) pouring a thin layer of polyester resin over the surface of the glass mold,
(v) pressing the top surface of the flat disk onto the glass mold until the thickness of the polyester resin layer is two-thousandths of an inch thick,
(w) controlling the thickness of the polyester resin layer by placing two-thousandths of an inch thick shims at the edge of the flat disk between the flat disk and the glass mold,
(x) repeating the above-process steps (r) and (s) of curing the polyester resin layer at the constant temperature of approximately 80 degrees Fahrenheit and separating the casting from the glass mold by placing the casting and the mold in a freezer,
(y) curing the casting for at least three weeks at 95 degrees Fahrenheit or more,
(z) repeating the above-process steps (t) through (y) to place another two-thousandths of an inch layer of polyester resin coating on top of the first layer of polyester resin coating on the top surface of the flat disk, (aa) repeating the above-process steps (t) through (x) to place another two thousandths of an inch layer of polyester resin on top of the second layer of polyester resin on the top surface of the flat disk, and (bb) covering the top surface of the flat disk with a coating of aluminum which reflects light for use as a mirror, (cc) whereby the finished flat disk has a single six-thousandths of an inch thick layer of polyester resin coating on the bottom surface and three successive layers of two thousandths of an inch thick polyester resin on the top surface and the flat disk is flat to within about one-quarter of a wavelength of light over a temperature range of 30 degrees Fahrenheit around the casting temperature.

11. In a method of making an optical mirror, the steps comprising (a) providing a rubber mold having a bottom wall with upright side walls extending from the edges of the bottom wall to form a mold chamber with the side walls having a shoulder between the top and bottom side walls, (b) pouring liquid plaster into the rubber mold to substantially fill the mold chamber with plaster, (c) providing a polished glass mold having a convex surface and a concave surface, (d) pushing the glass mold into the rubber mold with the convex surface of the glass mold facing downwardly and the concave surface of the glass mold facing upwardly, (e) sealing the plaster between the molds by pressing the bottom of the glass mold against the shoulder of the upright walls of the rubber mold, (f) turning the molds upside down so that any bubbles in the plaster rise toward the bottom wall of the rubber mold and move away from the convex surface of the glass mold, (g) allowing the plaster to harden for about half an hour to produce a plaster casting having a concave surface and a convex surface, (h) separating the plaster casting from the glass mold and the rubber mold, (i) allowing the plaster casting to cure for about one week or until thoroughly dry, (j) separately placing the plaster casting and the glass mold in a heater cabinet with the concave surface of the plaster casting facing upwardly, (k) heating both the plaster casting and the glass mold at the same temperature of about 95° Fahrenheit, (l) coating the convex surface of the glass mold with a mold release, (m) pouring a plastic resin onto the convex surface of the glass mold to coat the convex surface of the glass mold with a resin layer, (n) pushing the coated glass mold down with its convex surface facing downwardly onto the matching concave surface of the plaster casting and applying about one pound per square inch to the glass mold to squeeze out the excess plastic resin from between the glass mold and the plaster casting, (o) maintaining the glass mold and plaster casting at a constant temperature to prevent thermal distortion of the mold or the casting, (p) holding the plaster casting, plastic resin layer, and glass mold at a constant temperature of about 95° Fahrenheit for about two hours until the plastic resin layer on the casting becomes hard, (q) separating the plastic resin coated plaster casting from the glass mold, (r) said separating being accomplished by placing the plastic resin coated casting and glass mold into a freezer to shrink apart the coated plaster casting and the glass mold because of the differences in thermal expansion, (s) curing the plastic resin coated plaster casting by placing it in a heated cabinet at about 95° Fahrenheit for about two weeks, (t) cleaning the plastic layer of the plaster casting, and (u) repeating the above process steps (m) through (r) to apply a second resin layer to the first resin layer, making the surface of the second resin layer smoother and more accurate than the surface of the first resin layer.

12. In a method of making an optical mirror, the steps comprising (a) providing a rubber mold having a convex bottom surface and vertical side walls which form a mold chamber, and a concave removable top, (b) pouring liquid plaster into the mold chamber and placing the top on the mold to form a rough plaster casting with a concave top surface and a convex bottom surface having the same shape as the desired optical mirror and a uniform thickness between the concave top surface and the convex bottom surface, (c) allowing the rough plaster casting to harden in the rubber mold chamber, (d) removing the hardened plaster casting from the rubber mold, (e) cooling the plaster casting by immersing it in water at room temperature, (f) polishing a convex glass mold, (g) covering the convex surface of the glass mold with a layer of wet plaster about one-sixteenth of an inch thick, (h) setting the concave surface of the plaster casting on the wet plaster layer in the glass mold, (i) allowing the wet plaster layer to harden onto the concave surface of the plaster casting, (j) removing, when the wet plaster layer has hardened onto the concave top surface of the plaster casting, the plaster coated plaster casting from the glass mold, (k) curing and drying the plaster coated plaster casting for about one week in dry air or until thoroughly dry, (l) treating the convex surface of the glass mold with a mold release, (m) maintaining the glass mold and the plaster casting at the curing temperature for plastic resin until the glass mold and plaster casting reach a constant temperature throughout their mass, (n) pouring resin onto the glass mold, (o) pressing the concave top surface of a finished dry plaster cast onto the plastic resin on the glass mold until the resin layer is at a desired thickness, (p) allowing the resin to cure and attach itself to the concave surface of the plaster casting for about 3 hours at curing temperature, (q) maintaining the glass mold and the plaster casting at uniform temperatures throughout the cure, (r) detaching the resin coated plaster casting from the glass mold after completing the cure of the resin coating,
(s) aging the resin coated plaster casting at a temperature of at least 95° F. for at least a week to allow all stresses in the resin to stabilize,
(t) cleaning the surface of the resin layer, and
(u) repeating steps (n) through (t) to apply a second resin layer to the first resin layer making the second layer smoother and more accurate than the first.

13. In a method for making an optically flat mirror, the steps comprising
 (a) casting a flat plaster disk to the diameter and approximate thickness of the desire flat mirror,
 (b) immersing the flat disk in water at room temperature for approximately one-half hour to saturate the flat disk with water and bring the temperature of the flat disk to equilibrium,
 (c) providing a glass mold which is flat and which has a diameter at least as large as the diameter of the flat disk,
 (d) removing the flat disk from the water,
 (e) wiping the excess water from the flat disk,
 (f) coating the surface of the flat glass mold with at thin layer of wet plaster,
 (g) pressing the top surface of the flat disk onto the wet plaster coating on the flat glass mold,
 (h) curing the thin layer of wet plaster for approximately an hour,
 (i) pulling the flat glass mold away from the flat disk so that the thin layer of plaster adheres to the top surface of the flat disk,
 (j) repeating the above process step (b),
 (k) repeating the above process steps (d) through (g) on the bottom surface of the flat disk so that both surfaces of the flat disk have a coating of plaster,
 (l) curing the flat disk in dry air until the casting is thoroughly dry,
 (m) coating the glass mold with a mold release,
 (n) placing the flat disk an the glass mold in a temperature controlled environment at 80° Fahrenheit until the flat disk and the glass mold come to the same temperature throughout their mass,
 (o) pouring a resin layer over one surface of the glass mold,
 (p) pressing the one surface of the flat disk onto the resin layer on the glass mold until the thickness of the resin layer is a desired thickness,
 (q) controlling the thickness of the plastic resin layer on the flat disk by placing shims at the edge of the flat disk between the flat disk and the glass mold,
 (r) curing the resin layer for three hours, while maintaining a constant temperature of approximately 80° Fahrenheit,
 (s) separating the flat disk from the glass mold by placing the flat disk and the glass mold in a freezer,
 (t) placing the flat disk and the glass mold into a temperature controlled environment at 80° Fahrenheit until the flat disk and the glass mold reach a constant temperature throughout their mass,
 (u) pouring a thin layer of resin over the surface of the glass mold,
 (v) pressing the other surface of the flat disk onto the resin layer on the glass mold until the thickness of the plastic resin layer is a desired thickness,
 (w) controlling the thickness of the plastic resin layer by lacing shims at the edge of the flat disk between the flat disk and the glass mold,
 (x) repeating the above-process steps (r) and (s) of curing the resin layer at the constant temperature of approximately 80° Fahrenheit and separating the casting from the glass mold by placing the casting and the mold in freezer,
 (y) curing the casting for at least three weeks at 95° Fahrenheit or more, and
 (z) repeating the above-process steps (t) through (x) to place a second layer of resin on top of the first layer of resin on one surface of the flat disk.

* * * * *